C. S. B. HENRY.
SAW HANDLE.
APPLICATION FILED APR. 12, 1916.
1,301,436.
Patented Apr. 22, 1919.
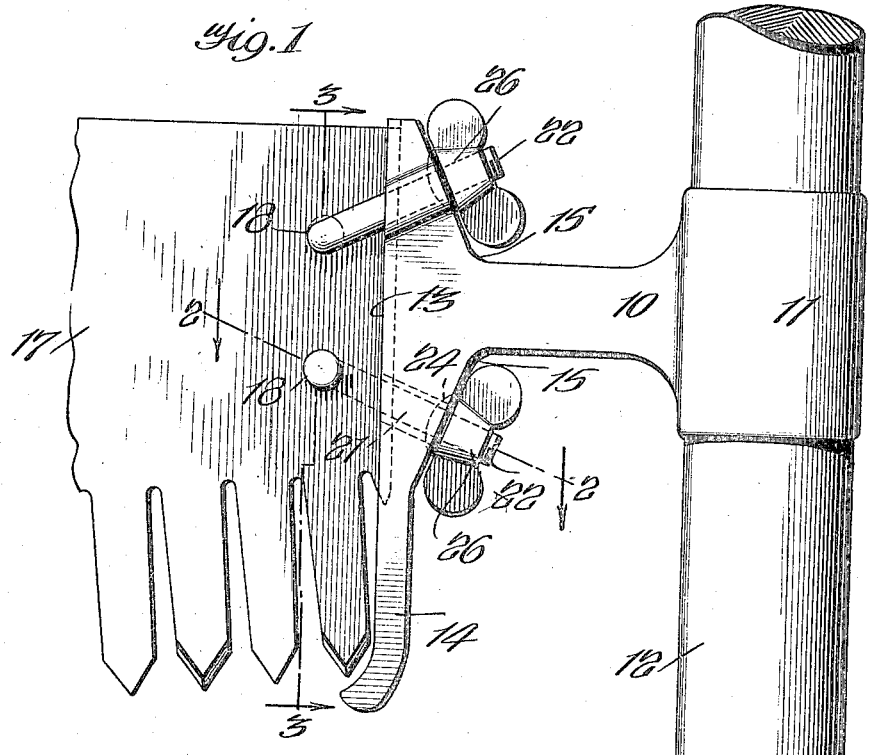
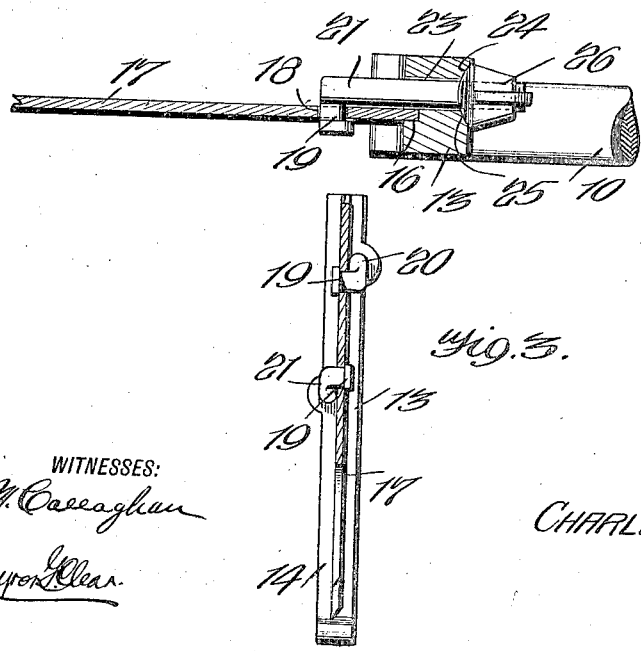
WITNESSES:
INVENTOR
CHARLES S. B. HENRY,
BY
ATTORNEYS

UNITED STATES PATENT OFFICE.

CHARLES S. B. HENRY, OF RAYMOND, WASHINGTON, ASSIGNOR OF ONE-HALF TO ORVILLE J. LOVERING, OF RAYMOND, WASHINGTON.

SAW-HANDLE.

1,301,436.  Specification of Letters Patent.  Patented Apr. 22, 1919.

Application filed April 12, 1916. Serial No. 90,596.

*To all whom it may concern:*

Be it known that I, CHARLES S. B. HENRY, a citizen of the United States, and a resident of Raymond, in the county of Pacific and State of Washington, have invented new and useful Improvements in Saw-Handles, of which the following is a specification.

My present invention relates generally to saw handles and more particularly to a saw handle for double end cross cutting saws, capable of ready and quick attachment to and detachment therefrom, my object being to provide certain improvements in the construction of the several parts whereby the connection may be rigidly maintained at all times.

In the accompanying drawing which illustrates the preferred form of my invention and which forms a part of this specification, Figure 1 is a side view illustrating my improvement in operative connection with a standard saw blade.

Fig. 2 is a section taken therethrough substantially on the line 2—2 of Fig. 1, and Fig. 3 is a similar view taken therethrough substantially on the line 3—3 of Fig. 1.

Referring now to these figures, the saw handle as proposed in my invention includes a shank 10, at one end of which is the usual bearing 11 having the cross piece 12, and at the opposite end of which is a head 13 having its outer face at right angles to the axis of the shank 10 and having an extending guard finger 14 at one end, the inner faces 15 of the head 13 above and below the shank 10 being inclined with respect to the axis of the shank, for a purpose which will now be described.

The outer face of the head 13 is provided with a longitudinal slot 16 for the reception of the adjacent end of a standard saw blade 17, having spaced openings 18 which receive therethrough in relatively opposite directions, as shown in Fig. 3, the angular ends 19 of a pair of hook bolts 20 and 21 extending along the relatively opposite faces of the saw blade 17, and the opposite ends 22 of which bolts are threaded and extended through angular openings 23 of increased diameter with respect to that of the bolts 20 and 21, formed through the head 13 at points equidistantly spaced upon opposite sides of the axis of the shank 10 and offset laterally with respect to one another, as is seen by a comparison of Figs. 1 and 3, these openings 23 being at right angles to the inner inclined faces 15 of the head before mentioned, and extending into concavities 24 in the said inclined faces, one of which is seen in Fig. 2. Convex washers 25 are disposed upon the outer portions of the bolts 20 and 21 within the concavities 24, and winged nuts 26 engage the outer threaded ends 22 of the bolts and bear against the washers 25, so that the bolts will be properly seated and the adjacent end of the saw blade 17 drawn into and evenly engaged within the slot 16 so as to be firmly and uniformly clamped in use.

It is obvious that my improvements provide a firm, even and rigid connection for the saw blade and handle, one which may be quickly attached and detached, and which may in the use of the saw be readily and effectively maintained at all times.

I claim:

1. The combination with a saw blade having spaced openings adjacent its end, of a handle including a shank having a head at one end provided with an outer face at right angles to the axis of the shank, and with inner angular faces at opposite sides of the shank, said outer face of the head being provided with a longitudinal slot to receive the end of the saw blade, hook bolts disposed upon relatively opposite sides of the blade and having outer angular ends extending through the blade openings in relatively opposite directions, and inner threaded ends, said head having angular openings therethrough upon opposite sides of the axis of the shank at right angles to the said inclined faces of the head and through which the inner ends of the bolts project and are laterally shiftable, said inclined faces of said head having concavities therein at the outer ends of the said openings, convex washers surrounding the inner ends of the bolts and disposed in the said concavities, and clamping nuts engaging the threaded ends of the bolts and bearing against the said washers for the purpose described.

2. The combination with a saw blade having spaced openings adjacent its end, of a handle including a head having a slotted outer face into the slot of which the end of the saw blade is movable, said head being provided with spaced inner inclined faces and with angular openings therethrough, convergent with respect to one another in a direction toward the saw blade and centrally of and at right angles to the said inclined faces, and clamping bolts extending through and laterally adjustable within the said openings of the head, said bolts projecting upon relatively opposite sides of the end of the saw blade extending within the slot of the head, and having angular hook ends projecting in relatively opposite directions through the openings of the saw blade, for the purpose described.

CHARLES S. B. HENRY.

Copies of this patent may be obtained for five cents each, by addressing the "Commissioner of Patents, Washington, D. C."